United States Patent
Godfrey et al.

(10) Patent No.: US 6,463,463 B1
(45) Date of Patent: Oct. 8, 2002

(54) SYSTEM AND METHOD FOR PUSHING CALENDAR EVENT MESSAGES FROM A HOST SYSTEM TO A MOBILE DATA COMMUNICATION DEVICE

(75) Inventors: James Godfrey; Hugh R. Hind; Gary Mousseau; Mihal Lazaridis, all of Waterloo (CA)

(73) Assignee: Research In Motion Limited, Waterloo (CA)

(*) Notice: Subject to any disclaimer, the term of this patent is extended or adjusted under 35 U.S.C. 154(b) by 0 days.

(21) Appl. No.: 09/649,755

(22) Filed: Aug. 28, 2000

Related U.S. Application Data

(63) Continuation-in-part of application No. 09/087,623, filed on May 29, 1998, now Pat. No. 6,219,694.

(51) Int. Cl.[7] .............................................. G06F 15/16
(52) U.S. Cl. ........................ 709/206; 709/247; 705/9; 340/7.21; 340/7.29
(58) Field of Search ................................. 709/206, 247, 709/238; 340/7.29, 7.43, 7.51–7.57, 7.21; 705/9

(56) References Cited

U.S. PATENT DOCUMENTS

| 5,086,502 A | 2/1992 | Malcolm |
| 5,159,592 A | 10/1992 | Perkins |
| 5,313,582 A | 5/1994 | Hendel et al. |
| 5,392,390 A | 2/1995 | Crozier |
| 5,410,543 A | 4/1995 | Seitz et al. |
| 5,416,473 A | 5/1995 | Dulaney, III et al. |

(List continued on next page.)

FOREIGN PATENT DOCUMENTS

| EP | 0617373 | 9/1994 |
| EP | 0736989 | 10/1996 |
| EP | 0772327 | 5/1997 |
| EP | 0777394 | 6/1997 |
| EP | 0788287 | 8/1997 |
| EP | 09214556 | 8/1997 |

(List continued on next page.)

OTHER PUBLICATIONS

Mosher, The Microsoft Exchange User's Handbook, 1997, Duke Communications, pp. 412–423.*

Dawson et al., RFC 2445, Internet Calendaring and Scheduling Core Object Specification (iCalendar), from http://www.cis.ohiostate.edu/cgi–bin/rfc/rfc2445.html, pp. 1–130, Nov. 1998.*

(List continued on next page.)

*Primary Examiner*—Glenton B. Burgess
*Assistant Examiner*—Bradley Edelman
(74) *Attorney, Agent, or Firm*—Jones, Day, Reavis & Pogue; Krishna K. Pathiyal, Esq.; Charles B. Meyer, Esq.

(57) ABSTRACT

A system and method for pushing information, such as calendar event messages, from a host system to a mobile data communication device upon sensing a triggering event is disclosed. A redirector program operating at the host system enables a user to continuously redirect calendar event messages, such as meeting reminders and notices, from the host system to the user's mobile data communication device upon detecting that one or more user-defined triggering events has occurred. The redirector program operates in connection with event generating applications and repackaging systems at the host system to configure and detect a particular user-defined event, and then to repackage the calendar event messages in an electronic wrapper prior to pushing the data items to the mobile device. An optimized data structure for storing the calendar event messages is also provided.

17 Claims, 10 Drawing Sheets

U.S. PATENT DOCUMENTS

| | | |
|---|---|---|
| 5,436,960 A | 7/1995 | Campana, Jr. et al. |
| 5,438,611 A | 8/1995 | Campana, Jr. et al. |
| 5,452,356 A | 9/1995 | Albert |
| 5,479,472 A | 12/1995 | Campana, Jr. et al. |
| 5,493,692 A * | 2/1996 | Theimer et al. ............ 455/26.1 |
| 5,495,484 A | 2/1996 | Self et al. |
| 5,559,800 A | 9/1996 | Mousseau et al. |
| 5,572,528 A | 11/1996 | Shuen |
| 5,579,472 A | 11/1996 | Keyworth, II et al. |
| 5,588,009 A | 12/1996 | Will |
| 5,598,536 A | 1/1997 | Slaughter, III et al. |
| 5,603,054 A | 2/1997 | Theimer et al. |
| 5,625,670 A | 4/1997 | Campana, Jr. et al. |
| 5,627,829 A | 5/1997 | Gleeson et al. |
| 5,633,810 A | 5/1997 | Mandal et al. |
| 5,641,946 A | 6/1997 | Campana, Jr. et al. |
| 5,666,530 A | 9/1997 | Clark et al. |
| 5,666,553 A | 9/1997 | Crozier |
| 5,673,322 A | 9/1997 | Pepe et al. |
| 5,727,202 A | 3/1998 | Kucala |
| 5,729,735 A | 3/1998 | Meyering |
| 5,737,531 A | 4/1998 | Ehley |
| 5,742,905 A | 4/1998 | Pepe et al. |
| 5,751,971 A | 5/1998 | Dobbins et al. |
| 5,754,954 A | 5/1998 | Cannon et al. |
| 5,757,901 A | 5/1998 | Hiroshige |
| 5,761,416 A | 6/1998 | Mandal et al. |
| 5,765,170 A | 6/1998 | Morikawa |
| 5,781,901 A | 7/1998 | Kuzma |
| 5,790,790 A | 8/1998 | Smith et al. |
| 5,790,974 A | 8/1998 | Tognazzini |
| 5,812,819 A | 9/1998 | Rodwin et al. |
| 5,813,016 A | 9/1998 | Sumimoto |
| 5,819,172 A | 10/1998 | Campana, Jr. et al. |
| 5,819,284 A | 10/1998 | Farber et al. |
| 5,822,434 A | 10/1998 | Caronni et al. |
| 5,826,062 A | 10/1998 | Fake, Jr. et al. |
| 5,838,926 A | 11/1998 | Yamagishi |
| 5,850,219 A | 12/1998 | Kumomura |
| 5,867,660 A | 2/1999 | Schmidt et al. |
| 5,878,434 A | 3/1999 | Draper et al. |
| 5,903,723 A | 5/1999 | Beck et al. |
| 5,928,329 A | 7/1999 | Clark et al. |
| 5,953,322 A | 9/1999 | Kimball |
| 5,960,406 A * | 9/1999 | Rasansky et al. ............ 705/9 |
| 5,961,590 A | 10/1999 | Mendez et al. |
| 5,974,238 A | 10/1999 | Chase, Jr. |
| 5,978,837 A | 11/1999 | Foladare et al. |
| 5,995,597 A | 11/1999 | Woltz et al. |
| 6,000,000 A | 12/1999 | Hawkins et al. |
| 6,006,274 A | 12/1999 | Hawkins et al. |
| 6,014,429 A | 1/2000 | LaPorta et al. |
| 6,016,478 A * | 1/2000 | Zhang et al. ................. 705/9 |
| 6,023,700 A | 2/2000 | Owens et al. |
| 6,034,621 A | 3/2000 | Kaufman |
| 6,052,563 A | 4/2000 | Macko |
| 6,058,431 A | 5/2000 | Srisuresh et al. |
| 6,078,921 A * | 6/2000 | Kelley ........................ 707/10 |
| 6,085,232 A | 7/2000 | Kikinis |
| 6,091,951 A | 7/2000 | Sturniolo et al. |
| 6,092,114 A | 7/2000 | Shimbo et al. |
| 6,092,191 A | 7/2000 | Shimbo et al. |
| 6,101,531 A | 8/2000 | Eggleston et al. |
| 6,115,394 A | 9/2000 | Balachandran et al. |
| 6,115,736 A | 9/2000 | Devarakonda et al. |
| 6,125,281 A * | 9/2000 | Wells et al. ................ 455/466 |
| 6,130,892 A | 10/2000 | Short et al. |
| 6,134,432 A * | 10/2000 | Holmes et al. ............. 455/412 |
| 6,138,089 A * | 10/2000 | Guberman ................. 704/207 |
| 6,141,690 A | 10/2000 | Weiman |
| 6,157,950 A | 12/2000 | Krishman |
| 6,167,379 A * | 12/2000 | Dean et al. .................... 705/9 |
| 6,222,942 B1 * | 4/2001 | Martin ....................... 382/232 |
| 6,240,088 B1 | 5/2001 | Gayton et al. |
| 6,249,820 B1 | 6/2001 | Dobbins et al. |
| 6,256,666 B1 | 7/2001 | Singhal |
| 6,272,545 B1 * | 8/2001 | Flanagin et al. ............ 709/228 |
| 6,275,848 B1 | 8/2001 | Arnold |
| 6,275,850 B1 | 8/2001 | Beyda et al. |
| 6,327,046 B1 * | 12/2001 | Miyamoto et al. ......... 358/1.15 |
| 6,332,156 B1 * | 12/2001 | Cho et al. ................... 709/206 |
| 6,363,352 B1 * | 3/2002 | Dailey et al. .................. 705/9 |
| 6,370,566 B2 * | 4/2002 | Discolo et al. ............. 709/206 |
| 2001/0001552 A1 * | 5/2001 | Vong et al. .............. 340/691.1 |
| 2001/0029531 A1 | 10/2001 | Ohta |
| 2001/0040693 A1 | 11/2001 | Saito et al. |
| 2001/0042093 A1 | 11/2001 | Saito et al. |
| 2001/0054072 A1 | 12/2001 | Saito et al. |
| 2002/0010748 A1 * | 1/2002 | Kobayashi et al. ......... 709/206 |

FOREIGN PATENT DOCUMENTS

| | | |
|---|---|---|
| EP | 0793387 | 9/1997 |
| EP | 0825788 | 2/1998 |
| EP | 0838774 | 4/1998 |
| EP | 0838934 | 4/1998 |
| EP | 0772327 | 2/1999 |
| EP | 0930766 | 7/1999 |
| WO | 9619064 | 6/1996 |
| WO | 9726709 | 7/1997 |
| WO | 9727717 | 7/1997 |
| WO | 973341 | 9/1997 |
| WO | 9732251 | 9/1997 |
| WO | 9741654 | 11/1997 |
| WO | 9744942 | 11/1997 |
| WO | 9800787 | 1/1998 |
| WO | 9821911 | 5/1998 |
| WO | 9823108 | 5/1998 |
| WO | 9848560 | 10/1998 |
| WO | 9919988 | 4/1999 |
| WO | 9945484 | 9/1999 |
| WO | 9948312 | 9/1999 |
| WO | 9950974 | 10/1999 |

OTHER PUBLICATIONS

Goldberg, The ecash byte–level encoding, http://www.cs-.berkeley.edu/~iang/ecash/encoding, last updated May 17, 1996.*

"BlackBerry Technical White Paper," Research In Motion Ltd., Version 1.0, 1998–1999.

Newsletter, "Battery Friendly Bulletin," vol. 1, Issue 3, pp. 1–7 and unnumbered page, 1999.

Article, Comerford, "Handhelds Duke It Out for the Internet," Wireless Internet, pp. 35–38 and 41, Aug. 2000.

Press Detail, "Extended Systems and Motorola Bring Short–Range Wireless to the Paging E–volution," Jan. 13, 2000 (3 pgs.).

Press Detail, "3Com Corporation Licenses Bluetooth Technology from Extended Systems," Feb. 22, 2000 (2 pgs.).

Web site Article, Hawaleshka, "The Web in Your Pocket," Maclean's, May 15, 2000 (3 pgs.).

Claxton, "Messaging API's for Voice Networks," Telecommunications, pp. 116–120, 1998.

Egevang, K. et al., "The IP Network Address Translator," Network Working Group, pp. 1–10, May 1994.

Manual, "Server and BBS Software for the Packet Radio" by Jean Paul Roubelat, pp. 1–173.

Book, "Internetwork Mobility The CDPD Approach," by Mark S. Taylor, William Waung, and Mohsen Banan, Jun. 11, 1996.

News Release, "Motorola Rings in 1995 with the Launch of the Marco® Wireless Communicator," Jan. 4, 1995 (4 pgs.).

Timeline, "FLEX™ Technology Timeline," (3 pgs.).

General Magic, Inc., Corporate Backgrounder, 2001 (2 pgs.).

Pegasus Email Settings, ABSnet Internet Services, Inc. (4 pgs.).

Motorola, Inc., emailVClient, 2001 (4 pages).

News Release, "Motorola Announces Pagewriter 250, The World's Smallest Pager with Full Keyboard", Feb. 27, 1997 (2 pgs.).

Dewey, Barney, "Communications Strategies for Newton 2.0," Newton Technology Journal, p. 10, Jun. 1996.

Press Release, "Motorola Announces New Solutions to Provide Consumers with Wireless Access to Personal and Enterprise E–mail Accounts," Mar. 21, 2001 (4 pgs.).

"Motorola's 'Marco' Wireless Communication," http://www.msu.edu/–luckie/gallery/marco.htm, Jun. 14, 2001 (3 pgs.).

News Release, "CE Software Announces MobileVision," Editorial Contacts, CE Software, Inc., 1995 (3 pgs.).

News Release, "CE Software Ship MobileVision," Jun. 20, 1995 (3 pgs.).

Newton Reference, Communications, 1996–1997(4 pgs.).

PC Pro Issue 31:Realworld Computing, PDA Column, Jul. 30, 1997 (7 pgs.).

Enterprise Solutions for Email Overload, Founder Publications, http:/www.amikanow.com/corporte/publications.htm, Aug. 6, 2001 (9 pgs.).

"Motorola's 'Marco' Wireless Communicator," http://www.msu.edu/–luckie/gallery/marco.htm, Aug. 6, 2001 (2 pgs.).

Press Release, "Apple Agrees to License Newton Technology to Schlumberger, Digital Ocean," Nov. 3, 1995 (3 pgs.).

Frezza, Bill, "PDA, PDA, Wherefore Art Thou, PDA?", Freewire, Aug. 6, 2001 (6 pgs.).

Black, Lauren, et al., "Personal Digital Assistants," Macworld Reviews, Aug. 6, 2001 (5 pgs.).

Reference, "MobileVision Direct Wireless Connection to Your LAN–Based Electronic Mailbox," CE Software, Inc., pp. 1, 3, 5, 7, 9, 11, 13, 15, 17, 19, 21, 1995.

User Manual, "MobileVision Direct Wireless Connection to Your LAN–Based Electronic Mailbox," CE Software, Inc. 1995.

Johnson, David B., "Ubiquitous Mobile Host Internetworking," Fourth Workshop on Workstation Operating Systems, pp. 85–90, Oct. 14–15, 1993.

Johnson, David B., "Mobile Host Internetworking Using IP Loose Source Routing," School of Computer Science, Carnegie Mellon University, pp. 1–14 Feb. 1993.

Schoettle, Bob, "IP–Address Management on LANs," Byte, pp. 199–200, Feb. 1996.

Cheshire, Stuart, et al., "Internet Mobility 4×4," Computer Science Department, Stanford University, pp. 1–12, Aug. 1996.

Yeom, Hoen Y., et al., "IP Mutliplexing by Transparent Port–Address Translator," Proceedings of the Tenth USENIX System Administration Conference, pp. 113–122, Sep. 29–Oct. 4, 1996.

Johnson, David B., "Scalable and Robust Internetwork Routing for Mobile Hosts," IEEE Computer Society, pp. 2–11, 1994.

Perkins, Charles, "IMHP: A Mobile Host Protocol for the Internet," Computer Networks and ISDN System, vol. 27, pp. 479–491, 1994.

Proceedings of the IEEE 7th International Workshop on Network and Operating System Support for Digital Audio and Video, Innsbrook Estates Conference Center, May 19–21, 1997, pp. 135–146.

Lucent Technologies, Bell Labs Technical Journal, vol. 2, No. 3, pp. 152–163, Summer 1997.

Lavana, Hemang, et al., Internet–Based Workflows: A Paradigm for Dynamically Reconfigurable Desktop Environments, Group 97, pp. 204–213, 1997.

Perkins, Charles E., et al., "Mobility Support in IPv6," Mobicom 96, pp. 27–37, 1996.

Goldszmidt, German, et al., "ShockAbsorber: A TCP Connection Router," IEEE, vol. 3, pp. 1919–1923, 1997.

Feibus, "A Desktop In Your Palm", Informationweek, Aug. 25, 1997, pp. 65ff.

Behr, "Handheld Solutions", Informationweek, Oct. 27, 1997, pp. 106–113.

Copy of DTS Wireless Website located at D.R.L. http://www.dtswireless.com.

"3Com PalmPilot Gets Wireless Link for E–Mail", Spooner, John G., PC Week, Dec. 8, 1997.

"Have Your Pager Call My Pager", Sullivan, Kristina B., PC Week, Dec. 8, 1997.

* cited by examiner

```
May 17 Messages    1 ✉  ✓
       Wed, May 17, 2000
✉ 11:38 zzAlbert    test 3
✉ 11:30 zzALbert    Accepted: Tes...
✓ 11:28 reqAddr     Test 7
✉ 11:20 Dan McCar...Re: Hello!!
✉ 11:20 Melinda He...Re: How are y...
✉ 11:08 Melinda He...Re: How are y...
✉ 10:28 Dan McCar...Re: Hello!!
✉ 10:27 Tim Tyhur...Re: not going
✉ 08:51 Wen Gao     Donuts in kitc...
✉ 08:49 Dan McCar...Hello!!
✉ 08:48 Akos Horv...Timbits!!
✉ 03:17 Wordsmith   A. Word. A. Day---
✉ 00:10 alert@      OPEC: Venezue...
       Tue, May 16, 2000
✉ 21:41 Selma Enns  re comouter
✉ 17:47 Phil Nguyen Recurring Mult
✉ 16:38 Tammy Ma... Reception area
```

```
From: zzAlbert Hecht-Enns   <Email:△
Subject: test 9
[1 Attachment(s)]
When: Wednesday, May 17, 2000    4:30
PM-5:00 PM <GMT-05:00> Eastern
Time <US & Canada)>.

*~*~*~*~*~*~*~*~*~* calendar <247>

```
Meeting Request
Start:      Wed. May 17. 2000    16:38
End:                             17:00
Reminder:                   15 minutes
Organizer:         zzAlbert Hecht-Enns
Invited:            Albert Hecht-Enns
Notes
When: Wednesday, May 17, 2000     4:30
PM-5:00 PM <GMT-05:00> Eastern
Time <US & Canada)>.

```
Meeting Request           Hide Menu
Start:      Wed. May 17.  Accept
End:
Reminder:                 Decline
Organizer:        zzAlbert Cancel
Invited:            Albert Hecht-Enns
Notes
When: Wednesday, May 17, 2000     4:30
PM-5:00 PM <GMT-05:00> Eastern
Time <US & Canada)>.

SYSTEM AND METHOD FOR PUSHING CALENDAR EVENT MESSAGES FROM A HOST SYSTEM TO A MOBILE DATA COMMUNICATION DEVICE

CROSS-REFERENCE TO RELATED APPLICATION

This application is a continuation-in-part of U.S. patent application Ser. No. 09/087,623, titled "System and Method for Pushing Information from a Host System to a Mobile Data Communication Device," filed on May 29, 1998, now U.S. Pat. No. 6,219,694.

BACKGROUND OF THE INVENTION

1. Field of the Invention

The present invention is directed toward the field of replicating information from a host system where the information is normally stored to a mobile data communication device. In particular, the system and method of the present invention provide an event-driven redirection computer program ("redirector program") operating at the host system, which, upon sensing a particular user-defined event has occurred, redirects user-selected data items, such as calendar event messages, from the host system to the user's mobile data communication device. The mobile data communication device is preferably coupled to the host system via a wireless network and one or more landline networks. Due to the bandwidth limitations of wireless networks, only a portion of a user-selected data item is generally redirected to the user's mobile device, with the user given the option of then retrieving the entire data item (or some other portion of the data item) from the host system.

Instead of warehousing (or storing) the user's data items at the host system and then "synchronizing" the mobile data communication device to data items stored at the host system when the mobile device requests that such items of information be communicated to it, the present invention employs a "push" paradigm that continuously packages and retransmits the user-selected items of information to the mobile data communication device in response to a triggering event detected at the host system. Wireless mobile data communications devices, especially those that can return a confirmation signal to the host that the pushed data has been received are especially well suited for this type of push paradigm.

2. Description of the Related Art

Present systems and methods for replicating information from a host system to a user's mobile data communication device are typically "synchronization" systems in which the user's data items are warehoused (or stored) at the host system for an indefinite period of time and then transmitted in bulk only in response to a user request. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Software executing on the mobile data communication device then transmits commands via the local communications link to the host system to cause the host to begin transmitting the user's data items for storage in a memory bank of the mobile device. In these synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system.

A general problem with these "synchronization" systems is that the only time that the user data items are replicated between the host system and the mobile data communication device is when the user commands the mobile device to download or pull the user data from the host system. Five minutes later a new message could be sent to the user, but the user would not receive that message until the next time the user fetches the user data items. Thus, a user may fail to respond to an emergency update or message because the user only periodically synchronizes the system, such as once per day.

Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; and (2) reconciling large amounts of data, as can accrue in these batch-mode synchronization systems, can require a great deal of communication between the host and the mobile device, thus leading to a more complex, costly and energy-inefficient system.

A more automated, continuous, efficient and reliable system of ensuring that user data items, such as calendar messages, are replicated at the user's mobile device is therefore needed.

Calendar event messages, such as meeting requests, are typically organized according to a particular calendar data structure. For example, RFC2445 (iCalendar), also referred to as ICAL, provides such a structure and standard method for defining calendar-related data messages. When combined with RFC2446 (iTIP), which defines a transport independent means for exchanging ICAL objects, a mechanism is provided to allow calendar systems on multiple platforms to inter-operate.

ICAL uses verbose text strings and values to represent electronic calendar data. The RFC 2445 standard for structuring ICAL messages does not make any attempt to reduce the size of the control information passed in the ICAL message. According to this known calendar message standard, message size is not as important as is readability of the message contents. The problem with using standards, such as ICAL, relates to sending calendar event messages over narrow bandwidth channels, like a wireless packet data network. In such a network, it is critical to reduce the size of the message as much as possible.

Therefore, there is a need for a system and method for sending and receiving and structuring calendar event messages, such as meeting requests, to and from a portable data communication devices over a wireless data network.

Furthermore, there remains a general need in this art for a system and method of continuously pushing user-selected data items (or certain portions of the selected data items), such as calendar event messages, stored at a host system to a user's mobile data communication device.

There remains a more particular need for such a system and method where user-selected data items are continuously "pushed" from the host system to the mobile data communication device upon the occurrence of one or more user-defined triggering events.

There remains an additional need for such a system and method that provides flexibility in the types and quantities of user data items that are pushed from the host system to the mobile data communication device and that also provides flexibility in the configuration and types of events that can serve to trigger the redirection of the user data items.

There remains yet an additional need for such a system and method that can operate locally on a user's desktop PC or at a distance via a network server.

There remains still another need for such a system and method that provides for secure, transparent delivery of the user-selected data items from the host system to the mobile device.

SUMMARY OF THE INVENTION

The present invention overcomes the problems noted above and satisfies the needs in this field for a system and method of pushing user-selected data items from a host system to a user's mobile data communication device upon detecting the occurrence of one or more user-defined event triggers. As used in this application, the term host system refers to the computer where the redirector software is operating. In the preferred embodiment of the present invention, the host system is a user's desktop PC, although, alternatively, the host system could be a network server connected to the user's PC via a local-area network ("LAN") ", or could be any other system that is in communication with the user's desktop PC.

A redirector program operating at the host system enables the user to redirect or mirror certain user-selected data items (or parts of data items) from the host system to the user's mobile data communication device upon detecting that one or more user-defined triggering events has occurred. Also operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored.

Using the redirector program, the user can select certain data items for redirection, such as E-mail messages, calendar events, meeting notifications, address entries, journal entries, personal reminders etc. Having selected the data items for redirection, the user can then configure one or more event triggers to be sensed by the redirector program to initiate redirection of the user data items. These userdefined trigger points (or event triggers) include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device. Although in the preferred embodiment it is anticipated that the configuration that specifies which data items will be redirected and in what form will be set at the host system, it is within the scope of this invention that such configuration may be set or modified through data sent from the mobile communications device.

In addition to the functionality noted above, the redirector program provides a set of software-implemented control functions for determining the type of mobile data communication device and its address, for programming a preferred list of message types that are to be redirected, and for determining whether the mobile device can receive and process certain types of message attachments, such as word processor or voice attachments. The determination of whether a particular mobile device can receive and process attachments is initially configured by the user of that mobile device at the host system. This configuration can be altered on a global or per message basis by transmitting a command message from the mobile device to the host system. If the redirector is configured so that the mobile data device cannot receive and process word processor or voice attachments, then the redirector routes these attachments to an external machine that is compatible with the particular attachment, such as an attached printer or networked fax machine or telephone. Other types of attachments could be redirected to other types of external machines in a similar fashion, depending upon the capabilities of the mobile device. For example, if a user is traveling and receives a message with an attachment that the user's mobile device can process or display, the user may from a mobile communications device send a command message to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system then repackages these items in a manner that is transparent to the mobile data communication device, so that information on the mobile device appears similar to information on the user's host system. The preferred repackaging method includes wrapping the user data items in an E-mail envelope that corresponds to the address of the mobile data communication device, although, alternatively, other repackaging methods could be used with the present invention, such as special-purpose TCP/IP wrapping techniques, or other methods of wrapping the user selected data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an internet- or intranet-based redirector program that could be accessible through a secure webpage or other user interface. The redirector program could be located on an Internet Service Provider's system and accessible only through the Internet.

In another alternative configuration of the present invention, a redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

Another aspect of the invention provides a new data structure for calendar events. The structure is based on a standard calendar data structure, such as ICAL. However, unlike the ICAL structure, which utilizes text strings that are long and verbose, the present invention provides a compressed data structure (referred to herein as "CICAL") that uses numerical tags to represent the text strings. Because these numerical tags are much shorter in length then the long and verbose text strings in ICAL, the calendar event message can be effectively compressed, which is particularly useful when transferring calendar event messages over wireless data networks.

Another aspect of the invention provides a system for sending and receiving meeting requests on a portable data communication device. The system comprises: a host system coupled to a host calendar, wherein the host calendar stores calendar data records; a portable data communication device coupled to a device calendar, wherein the device calendar stores calendar data records; a network coupling the host system to the portable data communication device; software operating at the host system for updating a calendar data record and for generating a meeting request that is transmitted to the device; and software operating at the portable data communication device for accepting and generating meeting requests.

Another aspect of the invention provides a method for receiving meeting requests via a portable communication device. The method includes the steps of: (i) a meeting request arriving at the host, (ii) the host sending the meeting request to a redirector application, (iii) the redirector application converting the meeting request into an e-mail with an attachment containing the meeting details, (iv) the redirector application sending to the device the e-mail with the attachment, (v) the device opening the attachment, (vi) the user of the device accepting or declining the meeting request, (vii) sending a response in an e-mail with an attachment containing the reply, and (viii) converting the e-mail into a meeting response item and sending the meeting response item to the original sender of the meeting request.

Another aspect of the invention provides a method for sending meeting requests from a portable data communication device comprising the steps of: (i) creating a meeting request on the device, (ii) translating the meeting request to an e-mail with a CICAL attachment, (iii) sending the e-mail to the redirector, (iv) the redirector processing the CICAL attachment, (v) sending the meeting request to the host, (vi) the host sending the meeting requests to the attendees.

The primary advantage of the present invention is that it provides a system and method for triggering the continuous and real-time redirection of user-selected data items from a host system to a mobile data communication device. Other advantages of the present invention include: (1) flexibility in defining the types of user data to redirect, and in defining a preferred list of message types that are to be redirected or preferred senders whose messages are to be redirected; (2) flexibility in configuring the system to respond to numerous internal, external and to networked triggering events; (3) transparent repackaging of the user data items in a variety of ways such that the mobile data communication device appears as though it were the host system; (4) integration with other host system components such as E-mail, TCP/IP, keyboard, screen saver, webpages and certain programs that can either create user data items or be configured to provide trigger points; and (5) the ability to operate locally on a user's desktop system or at a distance via a network server.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein:

FIGS. 10–13 set forth a preferred set of graphical user interface screens for the portable data communication device showing the steps of receiving and accepting a meeting request

DETAILED DESCRIPTION OF THE DRAWINGS

Figure 1:
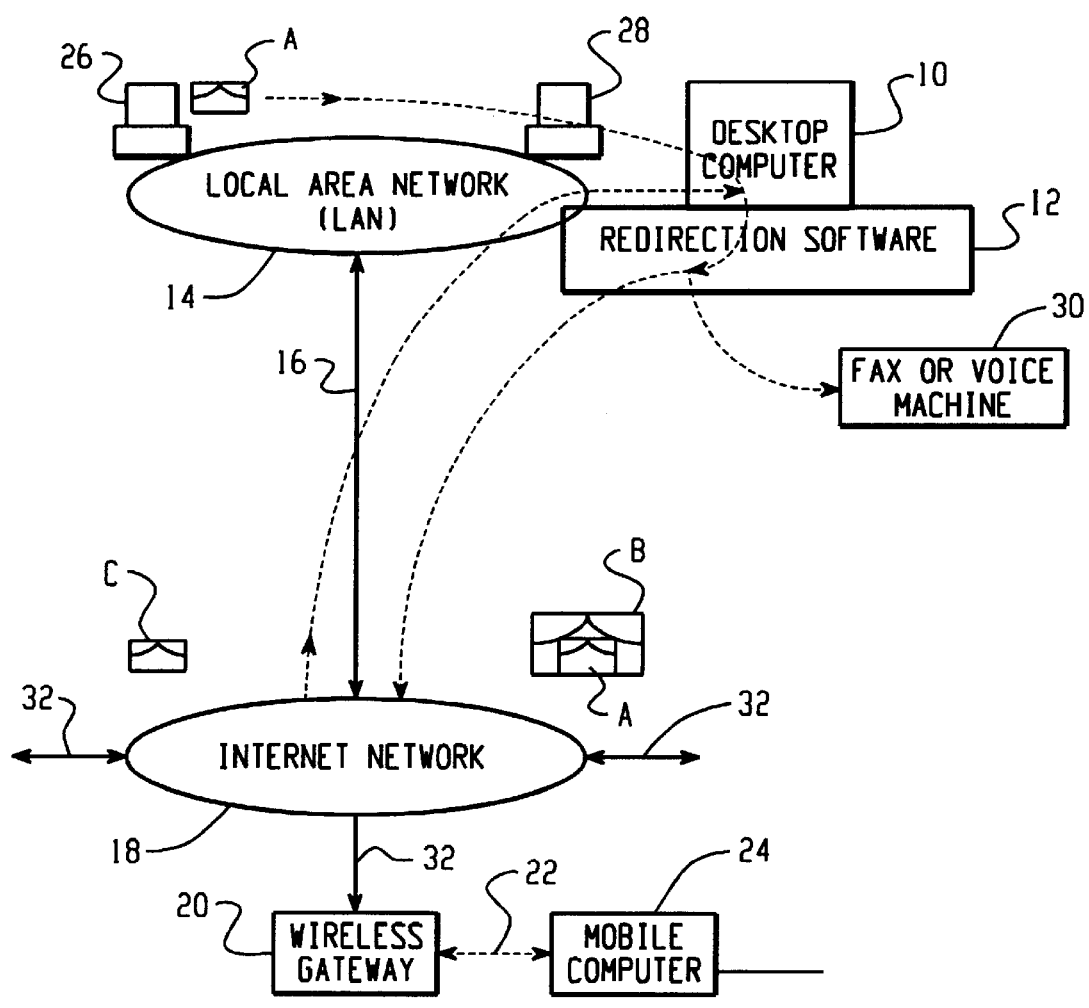
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices to 24. Also shown in FIG. 1 is machine 30, which could be a FAX machine, a printer, a system for displaying images (such as video) or a machine capable of processing and playing audio files, such as a voice mail system. The present invention includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the invention, but rather to illustrate the variety of possibilities embodied in the redirection concept.

Figure 4:
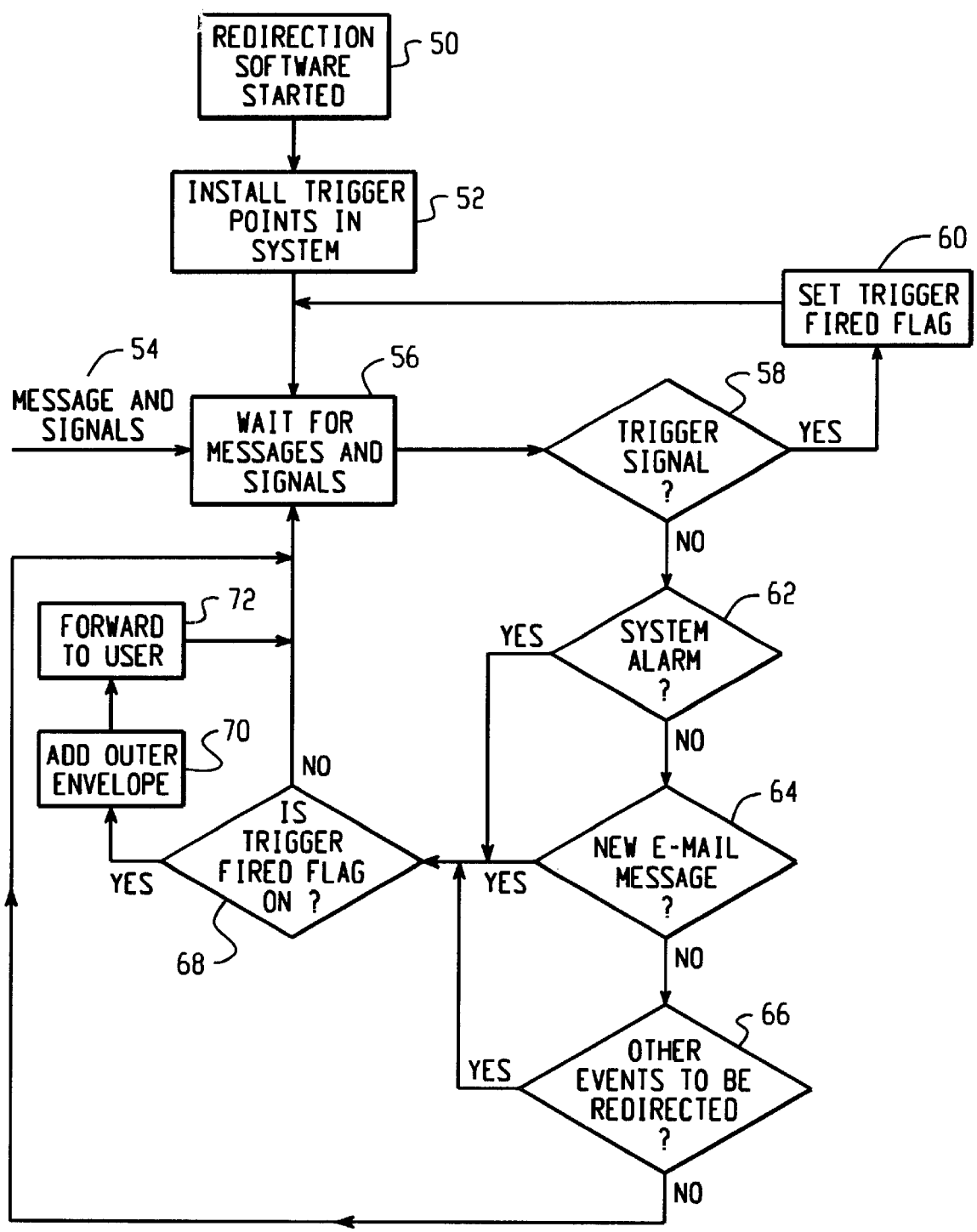
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment of the present invention, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1–4.

A user of the present invention can configure the redirector program 12 to push certain user-selected data items to the user's mobile data communication device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12 are in the preferred embodiment external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present invention to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used with the present invention.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment, this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and resend it to the user's mobile data device, as described above.

Figure 2:
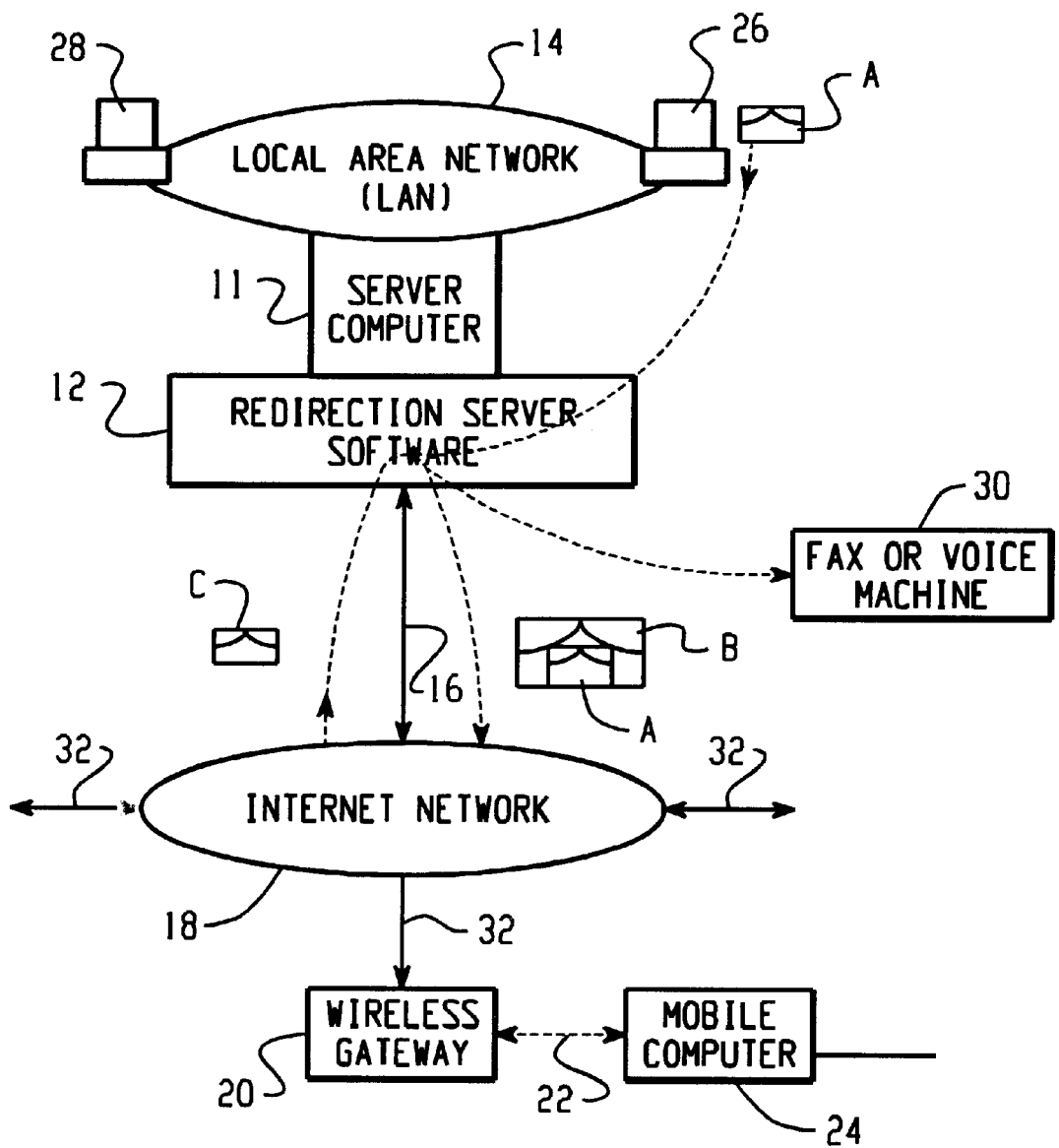
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
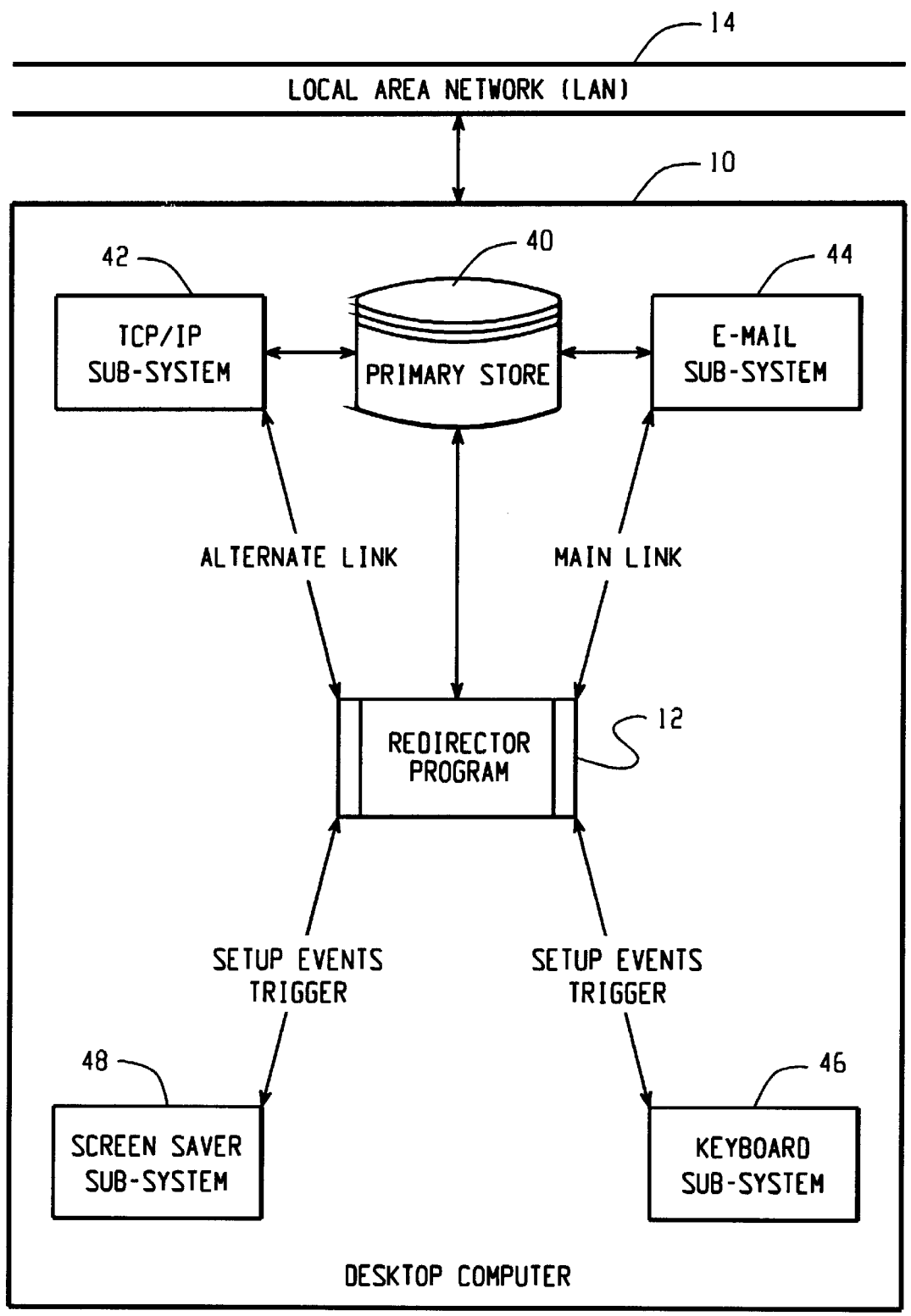
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the present invention can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, 10 minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
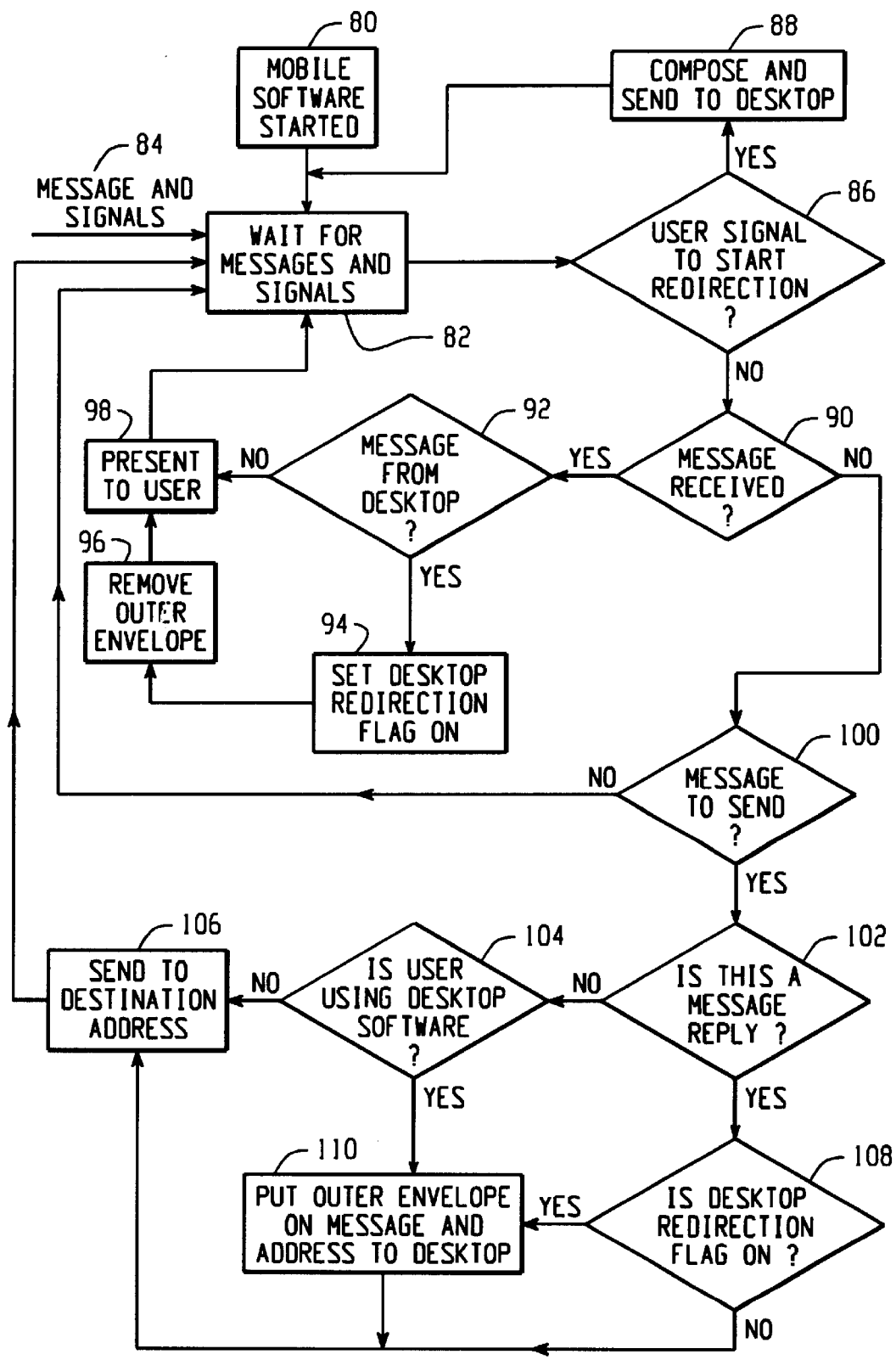
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12 of the present invention. At step 80 the mobile software is started and the mobile device 24 is configured to operate with the system of the present invention, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Figure 6:
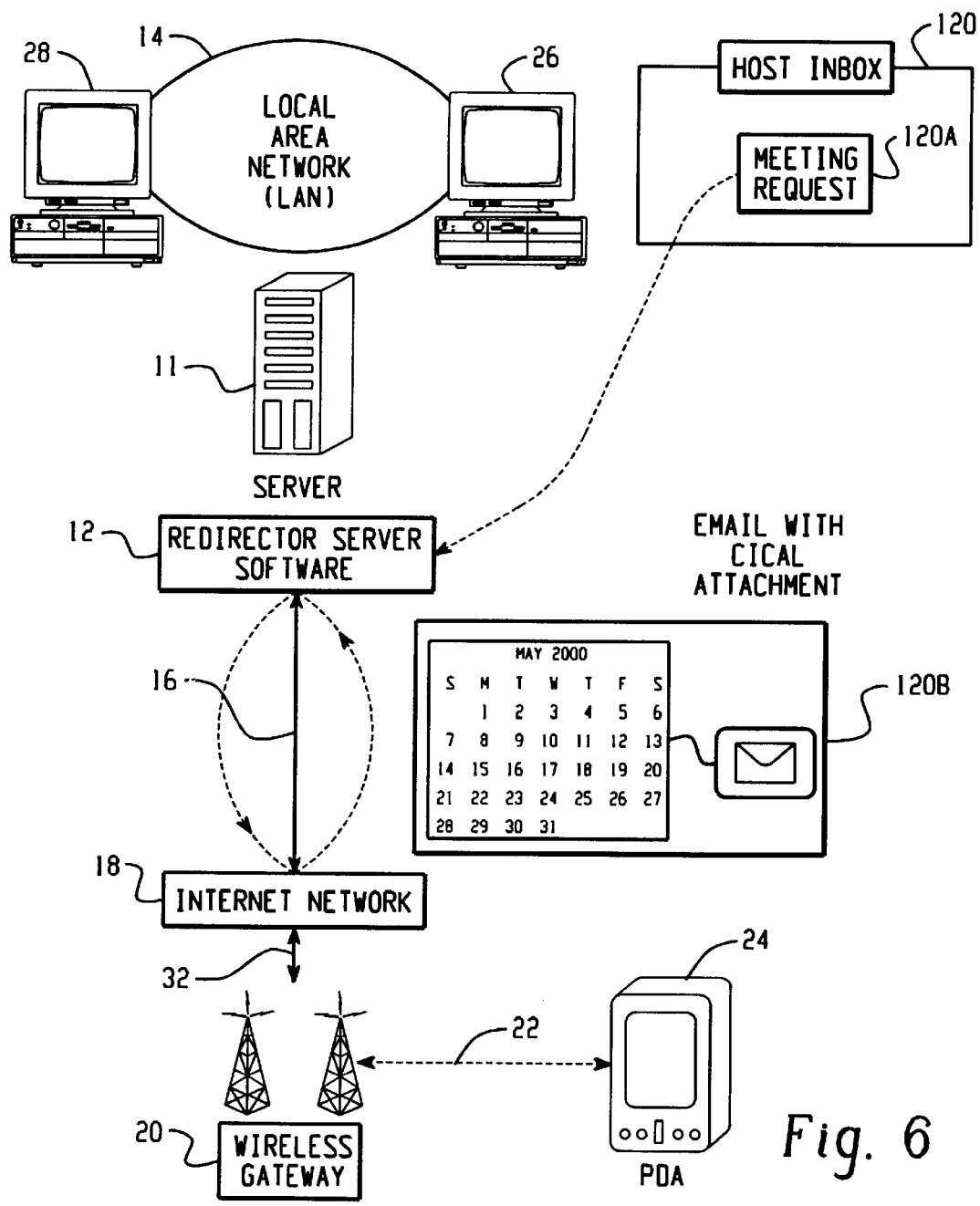
FIG. 6 is a diagram of a preferred system for sending and receiving calendar event messages, such as meeting requests, to and from a portable data communication device via a wireless data network.

FIG. 6 is a diagram of a preferred system for sending and receiving calendar event messages, such as meeting requests, between a host inbox 120 and a portable data communication device (Device) 24 via a wireless network. In the preferred environment shown in FIG. 6, the host system 11 is in communication with the portable communications device 24 via a TCP/IP network 18, such as the Internet, for communicating RF messages to and from the Device 24.

As shown in FIG. 6, and described in more detail below, the present invention preferably includes hardware, software and data structures for enabling the receiving and sending of meeting requests 120A to a Device 24. In the preferred embodiment shown in FIG. 6, the system includes at least one host inbox 120, and at least one portable communication device 24. Associated data structures including a meeting request 120A are stored in the host inbox 120. Software executing at the portable device 24 and at the host system 11 enables the meeting requests to be sent from and received by a device 24.

Operationally, one of the systems 26, 28 coupled to the LAN 14 may generate a meeting request 120A, which is preferably stored in the host inbox 120. The redirector server software operating at the server 11, has access to the host inbox 120, and detects the arrival of the new meeting request 120A. The redirector software 12 then transforms the format of the meeting request 120A from a first format, such as the ICAL format, in which information regarding the meeting is formatted using verbose text strings, into a second format. As described in more detail below, according to this second format, the verbose text strings of the first format are converted into corresponding numerical values, thereby compressing the information associated with the meeting request 120A. This compressed meeting request is then attached to an e-mail and communicated via network 16 18, 32, 20, and 22 to the portable data communication devices 24 that are associated with the meeting request.

Figure 7:
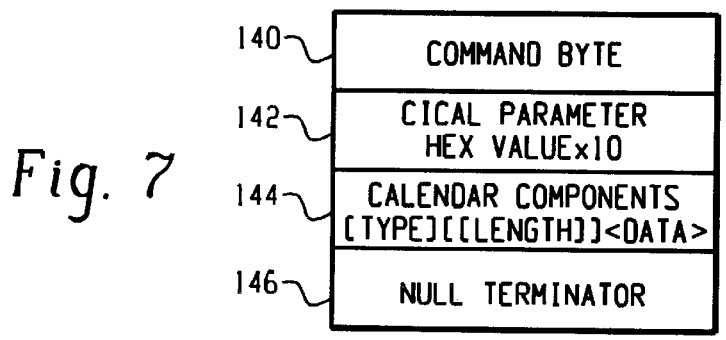
FIG. 7 is a schematic of a preferred data structure for a calendar event message according to an embodiment of the present invention in which meeting requests are sent from and received by a portable data communication device.

FIG. 7 describes the preferred calendar event data structure associated with the second format. This structure is based on a standard ICAL structure, but the long text strings associated with ICAL are compressed using numerical values to represent the text strings. This structure allows for easier transmission over the wireless networks because the amount of data transmitted is reduced. The compressed data structure, referred to herein as CICAL, compresses information about the meeting such as attendees, time that the meeting starts and ends, location of the meeting, the identity of the meeting organizer, a time for reminder notification, and any additional notes about the meeting.

The proposed transformation of the ICAL data to a CICAL structure exploits the inherent binary nature of the wireless transport protocol. In order to reduce the complexity on the wireless mail gateway 20, the transformation is designed to be easily reversible.

Assuming the receiver reverses the transformation before it is submitted to the calendar application, the transformation becomes a transparent presentation layer compression method. Therefore, applications that prefer to use the standard Internet message encoding receive the same benefits as the applications that prefer to use the transformed contents directly.

The general encoding rules for the CICAL data structure are as follows: (1) Convert enumerated types into byte codes; (2) Use a type-length encoding for fields rather than terminators (e.g. LF and/or CR); (3) Undo content transfer encoding (base64, quoted-printable, etc.); and (4) Use the length, in bytes, of the calendar instead of a unique boundary string.

The preferred format of a CICAL message includes the following segments (as shown in FIG. 7): Command Byte 140; Version Number 142; Calendar Components 144; and NULL terminator 146. The specific formats of each part of the CICAL structure will be further described below.

Version Number (142)

The version number is preferably a single byte. The version number for all CICAL messages conforming to this specification is the hex value 0x10. Note, however, that another version number could be utilized.

Length Structure (144)

The Calendar Components 144 segment in the CICAL data structure includes a length structure. The length structure contains the length of the data that follows. The structure contains a variable number of bytes. The most significant bit of each byte is used as a structural indicator, if the most significant bit is set then the following byte is also part of the length structure. If the most significant bit is clear then the current byte is the last byte of the length structure. In particular a k-byte length structure appears as a sequence of (k−1) bytes each with the most significant bit (MSB) set followed by a single byte with the MSB cleared. The value of the length structure is obtained from the least significant 7 bits of each byte concatenated in big-endian format, for example [0x85][0x99][0x23] is equivalent to the binary value 000 0101 001 1001 010 0011 or in decimal notation 85155.

Notice that it is explicitly intended that a length structure may contain a number of 0x80 bytes as leading bytes. While such bytes do not contribute to the length, they allow for implementations where certain length structures are expected to comprise a fixed number of bytes. For implementations conforming to the current specification support form length structures up to and including five bytes is required.

Example: [0x80][0x3A] is a two byte length structure with the decimal value 58.

Calendar Components (144)

The calendar components segment 144 has the following format:

Component properties;

(NULL Terminator after last property).

Component properties are type-length encoded. Each component property has the following general format:

[type][[length]]<data> where [type] is a single byte with one of the values listed below, [[length]] is a length structure comprising a variable number of bytes, and <data> represents the contents of the property and is exactly the number of bytes specified by the [[length]] structure.

Type Byte

The list of preferred defined type bytes is given below:

RESERVED=0x00;
CICAL_COMPONENT=0x01;
CICAL_UID=0x02;
CICAL_SEQUENCE=0x03;
CICAL_CALENDAR_ID=0x04;
CICAL_RELATED_TO=0x05;
CICAL_ORGANIZER=0x06;
CICAL_ACCEPTED=0x07;
CICAL_DECLINED=0x08;
CICAL_TENTATIVE=0x09;
CICAL_NEEDSACTION=0x0A;
CICAL_DSTART=0x0B;
CICAL_DTEND=0x0C;
CICAL_SUMMARY=0x0D;
CICAL_LOCATION=0x0E;
CICAL_TRIGGER=0x0F;
RRULE_FREQUENCY=0x10;
RRULE_DAYOFWEEK=0x11;
RRULE_MONTH=0x12;
RRULE_DAYOFMONTH=0x13;
RRULE_COUNT=0x14;
RRULE_INTERVAL=0x15;
RRULE_BYSETPOSITION=0x16;
CICAL_EXDATE=0x17;
CICAL_DESCRIPTION=0x18;
CICAL_RECURRENCEID=0x19;
CICAL_XREVISION=0x1A;
UNDEFINED=0xFF.

Consider now the following example transformation from a standard format ICAL message according to RFC 2445 to a message formatting according to the CICAL format of the present invention.

Calendar message (taken from RFC2445):

BEGIN: VCALENDAR
METHOD:PUBLISH
BEGIN:VEVENT
SEQUENCE:0
UID:3735928559
ORGANIZER:MAILTO:jdoe@host1.com
ATTENDEE;cn="John Smith":MAILTO:Jsmith@host1.com;PARSTST=ACCEPTED
DTSTART:19970324T123000Z
DTEND:19970324T210000Z
SUMMARY:Calendaring Interoperability Planning Meeting
DESCRIPTION:Discuss how we can test c&s interoperability\n
using iCalendar and other IETF standards.
LOCATION:LDB Lobby
END:VEVENT
END:VCALENDAR In the following CICAL version of the above calendar message, each byte code is represented by a word inside square brackets. For example, [Summary] would represent a one-byte value assigned to represent the "SUMMARY:" token. Literal binary values are simply placed between the brackets. For example, [0] represents a NULL character. A structure of the form [[n]] is a variable length structure (defined elsewhere in this document) representing a length of n bytes. Any newlines and tabs in the transformed message are for the sake of readability only.

The transformed message would be formatted as:

[0x10]
[Command Byte]
[Component Type][[1]][0x01] (VEVENT)
[Sequence][[4]] [0x00][0x00][0x00][0x00]
[UID][[4]] [0xDE][0xAD][0xBE][0xEF]
[Organizer][[16]] [0x01][[14]]jdoe@host1.com
[Attendee Accepted][[27]]jsmith@host1.com[0]John Smith
[Start Date][[4]]<Format defined below>
[End Date][[4]]<Format defined below>
[Summary][[45]] Calendaring Interoperability Planning Meeting
[Description][[87]] Discuss how we can test c&s interoperability\n using iCalendar and other IETF standards.

[Location][[9]] LDB Lobby
[0]
[0]

A cursory comparison of these two structures shows how much smaller the CICAL version of the message is in comparison to the ICAL version.

In addition to the CICAL data structure described above, the present invention provides a series of command bytes that define a particular action. These command bytes include at least the following types of calendar commands: (1) meeting request from portable device; (2) meeting request from server; (3) meeting response from portable device; (4) meeting response from server; (5) meeting cancel from portable device; and (6) meeting cancel from server. Other and additional commands could also be included.

Figure 8:
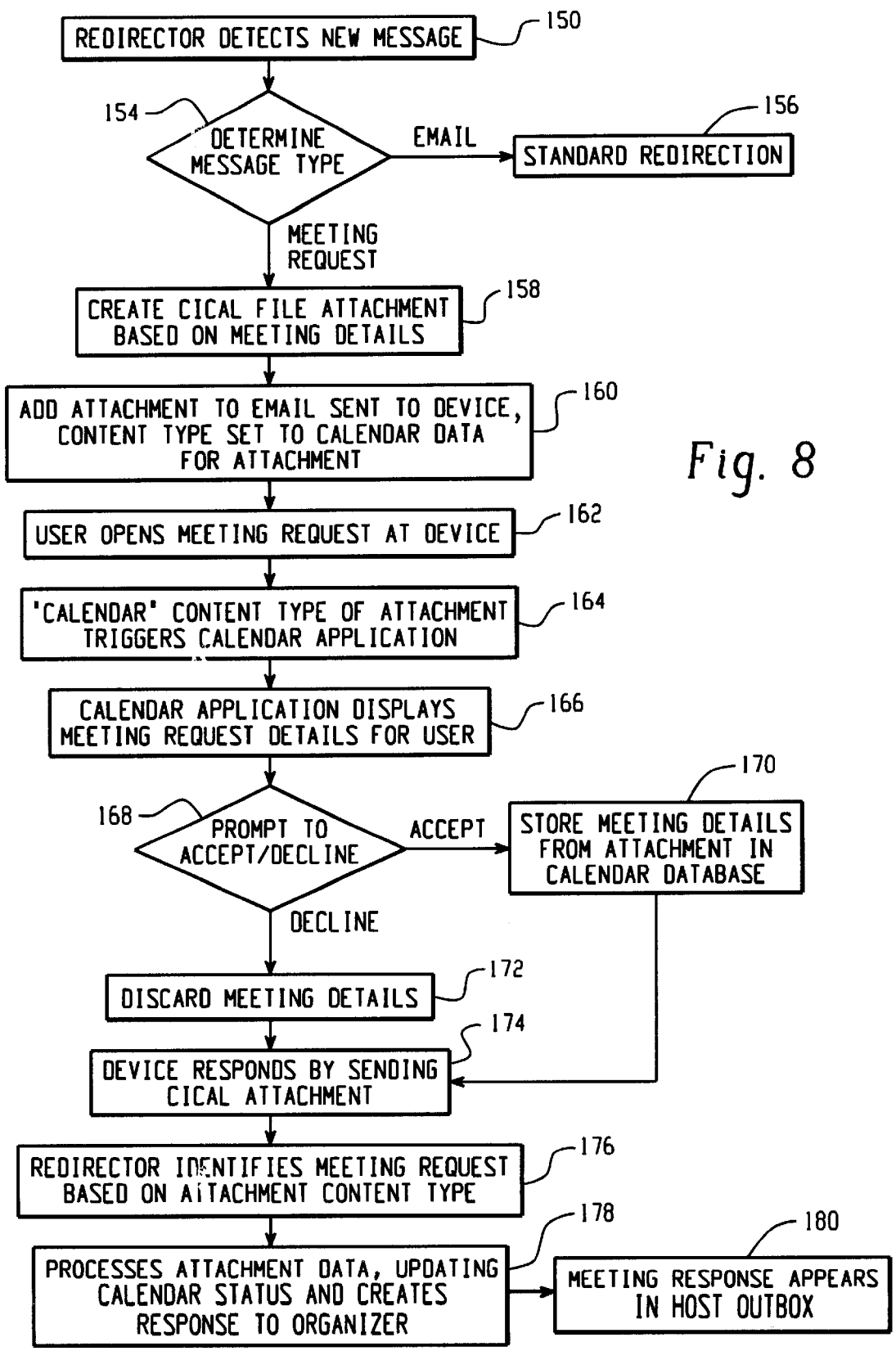
FIG. 8 is a flow chart showing the preferred method of receiving a meeting request at a portable data communication device sent from a host system.

FIG. 8 shows a way of using the CICAL structures to send calendar information, such as meeting requests, over the wireless network. This figure is a flow diagram that describes the method for a portable data communication device (Device) to receive a meeting request. In step 150, the host inbox 120 receives a meeting request. At step 152, the redirector application 12 detects the presence of the new message in the host inbox 120. At step 154, the redirector 12 determines the type of message present in the host inbox 120, for example by a message class provided by the Host mail system. If the message class indicates the item is a standard e-mail message, normal e-mail redirection is performed at step 156. If the redirector 12 determines the message class of the item corresponds with a meeting request, however, then the redirector 12 translates the meeting details (information) into the CICAL format, and generates an attachment in step 158 with the corresponding CICAL information.

At step 160, the redirector sends the Device an e-mail having the CICAL attachment, with a content type indicating the data is calendar related, for example 'calendar', representing the meeting request enclosed. As described above, a command byte is also included with the CICAL attachment indicating the type of calendar command, i.e., meeting request, meeting reply, or meeting cancel. At step 162, the Device opens the message having the attachment in an associated Messaging application operating at the Device. At step 164, the Message application detects the content type of the attachment as 'calendar' and launches a Calendar application, providing the Calendar application with the CICAL data from the attachment. The Calendar application then displays the meeting data in step 166. The Device then prompts a user to accept or decline the meeting request in step 168. If the user accepts the meeting request, then Device stores the meeting in a Calendar database, at step 170. If the user declines the meeting request, however, then at step 172, the Device discards the meeting request.

At step 174, the Device sends a reply with the user's response in an e-mail with a CICAL attachment of content type 'calendar'. At step 176, the redirector 12 detects the 'calendar' content type of the meeting response. At step 178, the redirector 12 processes the attachment data and either deletes or updates the calendar item corresponding to the meeting, depending on the user response. The redirector 12 also sends the response to the meeting organizer (i.e., the system that generated the meeting request). At step 180, the meeting response appears in the host outbox.

Figure 9:
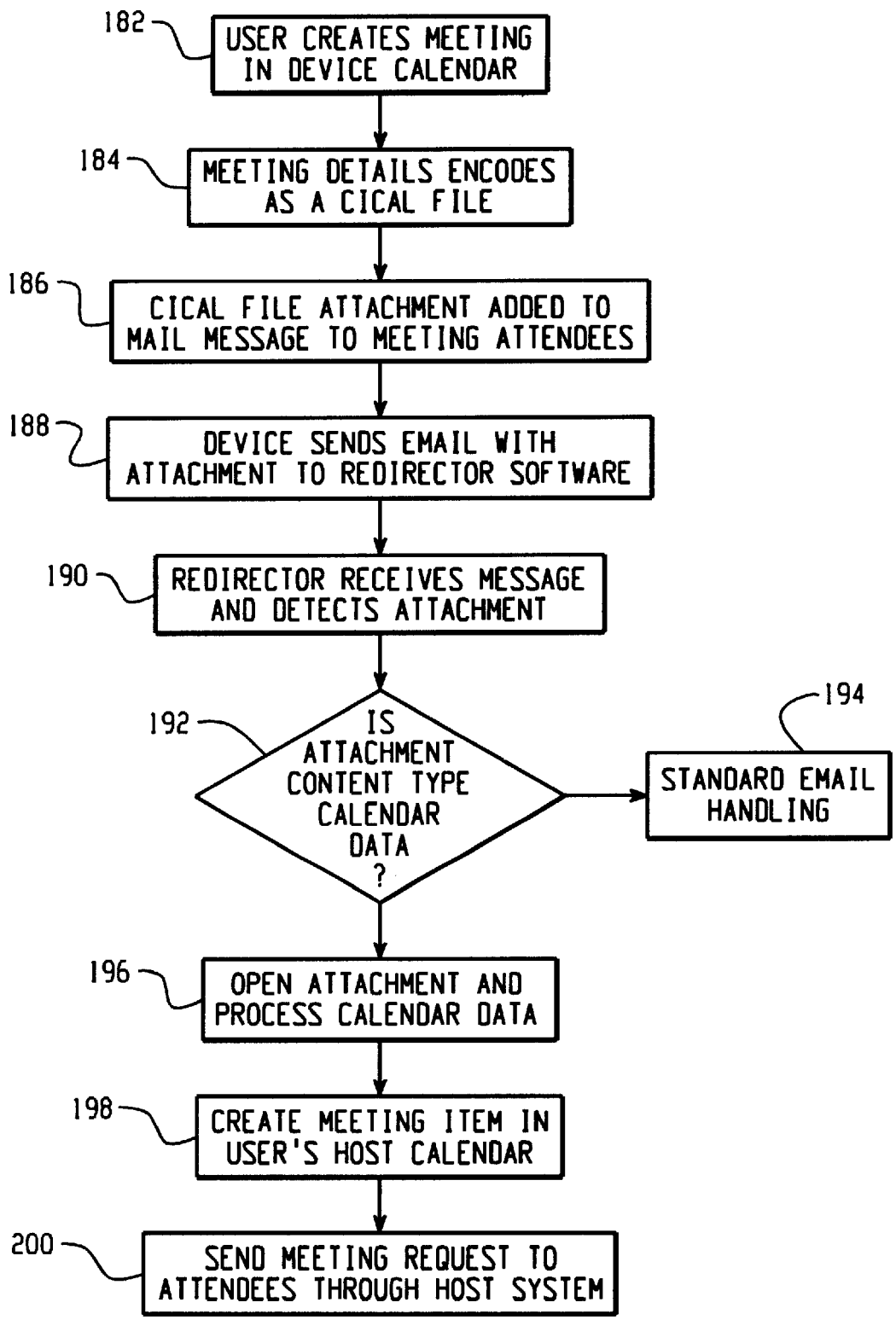
FIG. 9 is a flow chart showing the preferred method of sending a meeting request from a portable data communication device to the host system.

FIG. 9 is a flow diagram that describes the method of sending a meeting request from the Device. At step 182, a user creates a meeting request on the Device. At step 184, the Device translates the meeting details into a CICAL attachment. The attachment is added to an e-mail message in step 186. The Device then sends the e-mail to the Redirector 12 at step 188. The Redirector 12 receives the message and detects the attachment in step 190. The redirector checks the content type of the attachment in step 192. If the content type is 'calendar', the attachment contains a meeting item and is processed in step 196. If the content type is anything else, then standard e-mail handling is performed in step 194. At step 198, the Redirector 12 creates a meeting item in the host calendar. At step 200, the host 11 sends the meeting request to the meeting attendees.

FIG. 10 is a drawing that depicts a proposed Device screen 300 when a meeting request is received. The meeting request appears as a new message. FIG. 11 depicts a proposed screen 310 for the Device when the message is opened. The message indicates that there is a calendar attachment 312. FIG. 12 is a drawing of the proposed Device screen 320 depicting the meeting request information. The information can include the meeting start time, the meeting end time, the location of the meeting, a reminder before the meeting starts, the identity of the organizer, the identity of other attendees, and any additional notes pertaining to the meeting. This screen 320, corresponding to a Calendar application operating on the Device, may be invoked manually by the user when an attachment is selected from the screen 310, or it may be launched automatically when the e-mail having the CICAL attachment is opened. FIG. 13 shows a proposed Device screen 330 including a pull-down menu 332 that a user would employ to reply to the meeting request. The user is given the option of accepting or refusing the meeting request. This pull-down menu 332 could be accessed by the user through a series of keystrokes on a keyboard, or through a thumbwheel.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed:

1. A method of redirecting electronic meeting request messages from a messaging server to a wireless mobile device via a wireless data network, comprising the steps of:

generating an electronic meeting request message at a desktop system, wherein the electronic meeting request message is directed to an e-mail account maintained by the messaging server;

receiving the electronic meeting request message at the e-mail account;

determining whether the e-mail account is associated with the wireless mobile device;

if the e-mail account is associated with the wireless mobile device, and the messaging server has been configured to redirect electronic meeting request messages from the e-mail account to the wireless mobile device, then:

(a) generating a file attachment at the messaging server, wherein the file attachment includes information contained within the electronic meeting request message;

(b) generating an e-mail message at the messaging server addressed using a wireless network address of the wireless mobile device, wherein the file attachment that includes the meeting request message information is attached to the e-mail message, and the e-mail message includes a content type indicator that indicates that the file attachment includes the meeting request message information; and (c) transmitting the e-mail message from the messaging server to the wireless mobile device via the wireless network;

receiving the e-mail message at the wireless mobile device and detecting the content type indicator in the e-mail message; and in response to detecting that the content type indicator indicates that the file attachment includes the meeting request message information, automatically executing a calendar application program on the wireless mobile device and displaying the information from the meeting request message contained in the file attachment.

2. The method of claim 1, wherein the electronic meeting request message is structured according to a first format in which information regarding the meeting is formatted using a plurality of verbose text strings, further comprising the step of:

prior to generating the file attachment at the messaging server, transforming the electronic meeting request message from the first format into a second format in which the plurality of verbose text strings are replaced with a plurality of numerical values in order to compress the electronic meeting request message.

3. The method of claim 2, further comprising the step of:

prior to displaying the information from the meeting request message at the wireless mobile device, decompressing the file attachment by transforming it from the second format to the first format.

4. The method of claim 1, further comprising the steps of:

prompting a user of the wireless mobile device to respond to the electronic meeting request message;

if the user responds affirmatively to the electronic meeting request message, then storing the electronic meeting request message information in a calendar database associated with the wireless mobile device; and if the user responds negatively to the electronic meeting request message, then discarding the meeting request information.

5. The method of claim 1, further comprising the steps of:

generating an electronic meeting reply message at the wireless mobile device and providing a file attachment that includes information contained within the electronic meeting reply message;

generating an e-mail message at the wireless mobile device addressed to the e-mail account maintained by the messaging server, wherein the file attachment that includes the meeting reply message information is attached to the e-mail message, and the e-mail message includes a content type indicator that indicates that the file attachment includes the meeting reply message information; and transmitting the e-mail message from the wireless mobile device to the messaging server via the wireless network.

6. The method of claim 5, further comprising the steps of:

receiving the e-mail message at the messaging server and detecting the content type indicator in the e-mail message; and in response to detecting that the content type indicator indicates that the file attachment includes the meeting reply message information, updating a calendar application data store at the messaging server associated with the user of the wireless mobile device.

7. The method of claim 6, further comprising the steps of:

storing the meeting reply message information at the e-mail account; and transmitting the meeting reply message from the messaging server to the desktop system where the electronic meeting request message was generated.

8. The method of claim 5, further comprising the steps of:

prior to providing the file attachment, transforming the electronic meeting reply message from a first format in which information regarding the meeting reply is formatted using a plurality of verbose text strings into a second format in which the plurality of verbose text strings are replaced with a plurality of numerical values in order to compress the electronic meeting reply message.

9. A method of redirecting a plurality of message types from a messaging server to a wireless mobile device, comprising the steps of:

receiving an electronic message at a first message store coupled to the messaging server;

determining whether the electronic message is an e-mail message or a meeting request message;

if the electronic message is an e-mail message, then redirecting the e-mail message from the first message store to the wireless mobile device via a wireless gateway coupling the messaging server to a wireless data network; and if the electronic message is a meeting request message, then providing a file attachment including information contained within the meeting request message and generating an e-mail message at the messaging server, wherein the file attachment that includes the meeting request message information is attached to the e-mail message, and the e-mail message includes a content type indicator that indicates that the file attachment includes the meeting request message information, and transmitting the e-mail message with the file attachment from the messaging server to the wireless mobile device via the wireless gateway coupling the messaging server to the wireless data network.

10. The method of claim 9, further comprising the steps of:

prior to providing the file attachment, transforming the electronic meeting request message from a first format in which information regarding the meeting request is formatted using a plurality of verbose text strings into a second format in which the plurality of verbose text strings are replaced with a plurality of numerical values in order to compress the electronic meeting request message.

11. A method of transmitting meeting request messages from a host system to a wireless mobile device, comprising the steps of:

receiving a meeting request message at the host system; wherein the host system is a messaging server generating a file attachment at the host system, the file attachment including the meeting request message;

generating an e-mail message at the host system, wherein the file attachment with the meeting request message is attached to the e-mail message, and wherein the e-mail message includes a content type indicator that indicates that the file attachment includes the meeting request message;

transmitting the e-mail message from the host system to the wireless mobile device via a wireless gateway coupling the host system to a wireless data network;

receiving the e-mail message at the wireless mobile device and detecting the content type indicator in the e-mail message; and in response to detecting that the content type indicator indicates that the file attachment to the e-mail message includes the meeting request message, executing a calendar application on the wireless mobile device and displaying the meeting request message.

12. The method of claim 11, wherein the wireless mobile device is a two-way pager, a wireless personal digital assistant, or a cellular telephone with data messaging capabilities.

13. The method of claim 11, further comprising the step of:

storing the meeting request message at an electronic mailbox coupled to the host system.

14. The method of claim 11, further comprising the steps of:

prior to generating the file attachment, compressing the meeting request message.

15. The method of claim 14, wherein the compressing step further comprises the step of transforming the meeting request message from a first format in which information regarding the meeting request is formatted using a plurality of verbose text strings into a second format in which the plurality of verbose text strings are replaced with a plurality of numerical values.

16. The method of claim 11, further comprising the steps of:

generating a meeting reply message at the wireless mobile device in response to a received meeting request message;

providing a file attachment including the meeting reply message;

generating an e-mail message at the wireless mobile device, wherein the file attachment is attached to the e-mail message; and transmitting the e-mail message with the file attachment from the wireless mobile device to the host system.

17. The method of claim 16, further comprising the steps of:

the host system determining that the file attachment is a meeting reply message; and storing the meeting reply message in an electronic mailbox coupled to the host system and transmitting the meeting reply message to a generator of a meeting request message, and updating a calendar database at the host system using information contained in the meeting reply message.

* * * * *

UNITED STATES PATENT AND TRADEMARK OFFICE
CERTIFICATE OF CORRECTION

PATENT NO. : 6,463,463 B1
DATED : October 8, 2002
INVENTOR(S) : Godfrey et al.

It is certified that error appears in the above-identified patent and that said Letters Patent is hereby corrected as shown below:

<u>Title page,</u>
Item [56], References Cited, U.S. PATENT DOCUMENTS, Patent No. 6,092,114, change "Shimbo et al." to -- Shaffer et al. --

<u>Column 22,</u>
Lines 52 and 53, change "receiving a meeting request message at the host system; wherein the host system is a messaging server" to -- receiving a meeting request message at the host system, wherein the host system is a messaging server; --

Signed and Sealed this

Third Day of June, 2003

JAMES E. ROGAN
*Director of the United States Patent and Trademark Office*